United States Patent [19]

Neumann

[11] 4,269,745
[45] May 26, 1981

[54] STYRENE SUPPRESSED UNSATURATED POLYESTER RESIN COMPOSITIONS

[75] Inventor: Dennis J. Neumann, Port Washington, Wis.

[73] Assignee: Freeman Chemical Corporation, Port Washington, Wis.

[21] Appl. No.: 137,553

[22] Filed: Apr. 4, 1980

[51] Int. Cl.³ .................... C08L 63/10; C08L 67/06
[52] U.S. Cl. ........................ 260/23 P; 260/22 CB; 260/28.5 R; 260/40 R; 525/36; 525/40; 525/49
[58] Field of Search ............ 260/22 CB, 23 P, 40 R, 260/28.5 R; 525/36, 40, 49

[56] References Cited

U.S. PATENT DOCUMENTS

| | | | |
|---|---|---|---|
| 2,843,556 | 7/1958 | Moorman | 525/49 |
| 3,249,615 | 5/1966 | Ackermann | 525/49 |
| 3,856,378 | 10/1958 | Lundberg | 525/49 |
| 3,875,094 | 4/1975 | Schroeter et al. | 525/40 |
| 3,922,247 | 11/1975 | Hazen et al. | 525/49 |
| 4,001,348 | 1/1977 | Selbeck et al. | 525/40 |

FOREIGN PATENT DOCUMENTS 851207 10/1960 United Kingdom ............ 525/40

Primary Examiner—Ronald W. Griffin

[57] ABSTRACT

An unsaturated polyester resin composition includes small quantities of hydrocarbon wax and small quantities of an unsaturated alkyd resin formed from the reaction of linseed oil fatty acids, alpha, beta-ethylenically unsaturated dicarboxylic acid and glycol. Styrene volatilization from the resulting system is reduced. The secondary bonding properties of the resulting resin composition are not adversely affected.

1 Claim, No Drawings

STYRENE SUPPRESSED UNSATURATED POLYESTER RESIN COMPOSITIONS

BACKGROUND OF THE INVENTION

1. Field of the Invention:

The present invention relates to unsaturated polyester resin compositions containing monomeric styrene wherein the volatilization of the styrene ingredient is suppressed by additives including hydrocarbon wax.

2. Description of the Prior Art:

Unsaturated polyester resin compositions normally include monomeric styrene as a copolymerizable monomer. The solution of monomeric styrene and unsaturated polyester resin is frequently identified as polyester resin syrups. The styrene customarily is present in an amount from 20 to 55 weight percent of the syrup. When polyester resin syrups are employed in hand lay-up or spray-up applications to produce glass fiber reinforced plastic products, the styrene monomer has a tendency to volatilize. The styrene volatilization is objectionable because (a) the cost of the lost styrene is appreciable;
(b) the variable loss of styrene from day-to-day and batch-to-batch may result in non-uniform product performance;
(c) the presence of styrene vapors in the atmosphere at the workplace constitutes a hazard to plastics workers.

Because of the workplace hazard, certain threshold concentration limits for styrene vapors have been established. In order to satisfy these limitations, it has been customary to introduce small quantities of hydrocarbon wax into the composition. The hydrocarbon wax tends to migrate to the surface of the plastic part during its formulation and to serve as a film which confines the styrene monomer within the part. While such systems have successfully suppressed the styrene volatilization, the products are deficient in secondary bonding characteristics. Customarily in hand lay-up and spray-up applications, relatively thick glass fiber reinforced plastic articles are produced in several layers. A first layer is applied and allowed to cure; thereafter a second layer is applied over the first layer and allowed to cure; thereafter, in some cases, additional layers are applied over the preceding layer and allowed to cure. The multiple layers are employed particularly with reinforced plastic products which have appreciable thicknesses. It is necessary that each succeeding layer achieves an acceptable bond to the preceding layer. Such bond is identified as a sedondary bond. In order to avoid the recognized shortcomings of the secondary bonding with styrene suppressed resins containing hydrocarbon wax, it has been recommended that each layer of the product be sanded or wiped with solvent or both before application of a second or succeeding layer of polymerizable plastic, particularly if the second or succeeding layers are to be applied more than 24 hours after the preceding has been applied.

There exists a need in the art to provide a polymerizable unsaturated polyester resin composition including monomeric styrene in which the volatilization of the styrene is successfully suppressed to acceptable levels without adversely affecting the secondary bonding characteristics of the resulting products.

SUMMARY OF THE INVENTION

According to the present invention, an unsaturated polyester resin syrup including monomeric styrene achieves acceptable styrene suppression without adversely affecting its secondary bonding characteristics when the unsaturated polyester resin syrup is combined with a small quantity of hydrocarbon wax and a small quantity of an unsaturated alkyd resin product of
alpha, beta-ethylenically unsaturated dicarboxylic acid; glycol; and
linseed oil fatty acids.
Preferably the amount of hydrocarbon wax is from 0.03 to 0.2 weight percent of the unsaturated polyester resin syrup; preferably the amount of unsaturated alkyd resin is from 0.5 to 7.0 weight percent of the unsaturated polyester resin syrup.

DESCRIPTION OF THE PREFERRED EMBODIMENT(S)

Unsaturated polyester resins are well-known in the plastics art. Customarily they are formed by the polyesterification of polyhydric alcohols and polycarboxylic acid, at least a portion of which is ethylenically unsaturated polycarboxylic acid. Customarily the polycarboxylic acids or acid anhydrides are dicarboxylic acids which may include phthalic acid, isophthalic acid, phthalic anhydride, terephthalic acid, adipic acid, succinic acid, mellitic acid, tetrahydrophthalic anhydride, halogenated phthalic acids. Maleic acid, maleic anhydride, fumaric acid, citraconic, itaconic acids, nadic anhydride are examples of ethylenically unsaturated dicarboxylic acids. Typical polyhydric alcohols are glycols and glycol ethers such as ethylene glycol, propylene glycol, butylene glycol, diethylene glycol, dipropylene glycol, polyethylene glycol, polypropylene glycol.

Other unsaturated polyester resins include reaction products of monoethylenically unsaturated carboxylic acids with diols or diol precursors such as bisphenol-A or bisphenol-A diglycidyl ethers. Customarily unsaturated polyester resins are combined into a polyester syrup with copolymerizable ethylenically unsaturated monomers, predominantly styrene although other monomers have been employed such as vinyl toluene, divinyl benzene, alpha methyl styrene, orthochloro styrene, acrylic acid, methacrylic acid, maleate esters, acrylic esters, methacrylic esters and the like. In addition to the polymerizable ingredients hereinabove recited, unsaturated polyester resin syrups customarily contain small but effective quantities of polymerization inhibitors such as quinones, catechols; polymerization promoters such as cobalt or vanadium salts; polymerization initiators such as peroxides; thixotropic agents such as silica aerogel, carboxy cellulose; pigments; inert fillers such as silica, calcium carbonate, titanium dioxide, magnesium oxide; and fibrous reinforcing material such as randomly oriented glass fibers or woven glass fabrics.

The present invention concerns those unsaturated polyester resin syrups containing styrene as copolymerizable monomer. Such polyester syrups customarily contain 20 to 55 percent by weight of copolymerizable monomer, predominantly styrene, i.e., the unsaturated polyester resin is 45 to 80 weight percent of the syrup. In order to minimize the styrene volatilization from such polyester syrups during polymerization, it has been customary to introudce small quantities of hydrocarbon waxes into the syrup. The hydrocarbon waxes successfully suppress the styrene volatilization but result in poor secondary bonding properties for the composition. According to the present invention, a conventional unsaturated polyester resin syrup including monomeric styrene also includes a small quantity, 0.03 to 0.2 weight percent (based on the weight of the unsaturated polyester resin plus styrene) of a hydrocarbon wax and 0.5 to 7.0 weight percent (based on the weight of the unsaturated polyester resin syrup) of an unsaturated alkyd resin product of alpha, beta-ethylenically unsaturated dicarboxylic acid or anhydride;
glycol; and
linseed oil fatty acids.

EXAMPLE 1

The following ingredients were combined to produce the unsaturated alkyd resin product of the present invention:
linseed oil fatty acid—2 moles;
ethylene glycol—3.3 moles;
maleic anhydride—2 moles.

The ingredients were heated under polyesterification conditions in the absence of catalyst until the acid value diminished to 10-20. The product was a clear liquid having a Gardner viscosity of Z.

Weight Loss Tests

An unsaturated polyester resin was obtained from the polyesterification of 1.05 moles propylene glycol, 0.6 moles phthalic anhydride, and 0.4 moles maleic anhydride. The unsaturated polyester resin was diluted with sufficient styrene to yield a polyester syrup containing 55 percent by weight unsaturated polyester and 45 percent by weight styrene. The resin syrup contained the usual inhibitors. The resin syrup was tested in a styrene volatilization test at 77° F. and 50% relative humidity by measuring the loss of weight (assumed to be styrene volatilization) after ½ hour, 1 hour, 2 hours, et cetera. The resin syrup was also tested with small quantities of paraffin wax and also with small quantities of paraffin wax and the polyester additive as described in Example 1. The results of the tests are shown in the following Table I. The effect of paraffin wax alone in achieving styrene suppression is observed by comparing tests 2 and 3 with the blank test 1.

TABLE I

| TEST | ADDITIVES % | | % WT. LOSS AFTER (HOURS) | | | |
|---|---|---|---|---|---|---|
| | Wax | Ex. 1 | 0.5 | 1.0 | 2.0 | 3.0 |
| 1 | 0 | 0 | 3.0 | 4.4 | 5.7 | 7.3 |
| 2 | 0.05 | 0 | 1.8 | 3.2 | 4.2 | — |
| 3 | 0.1 | 0 | 0.6 | 1.0 | — | — |
| 4 | 0.05 | 1.0 | 2.8 | 3.4 | — | — |
| 5 | 0.05 | 3.0 | 2.0 | 2.7 | — | — |
| 6 | 0.075 | 3.0 | 2.0 | 2.7 | — | — |
| 7 | 0.1 | 3.0 | 0.4 | 0.5 | — | — |
| 8 | 0.05 | 5.0 | 2.0 | 2.9 | — | — |
| 9 | 0.075 | 5.0 | 1.6 | 2.1 | — | — |

The improvement of the combination of the paraffin wax and the polyester resin syrup of Example 1 can be observed when comparing the results of tests 4, 5, 6, 7, 8, 9 with the results of test 1. In all cases the paraffin wax plus polyester resin syrup of Example 1 developed improved styrene suppression when compared to the blank resin of test 1.

Laminates were fabricated from the polyester resin described in connection with the tests of Table I (1.05 moles propylene glycol, 0.6 mole phthalic anhydride, 0.4 mole maleic anyhydride) in a resin syrup containing 55 percent by weight polyester, balance styrene. Laminates were prepared with 2 plies of 2 ounce glass fiber mat, containing 20 percent glass by weight (in one instance) and 25 percent glass by weight (in another instance). In each case two laminate layers were prepared wherein the second lay-up was applied immediately followed the first lay-up; in a second instance where the second lay-up was applied 24 hours after the first one; and in a third instance where the second lay-up was applied 48 hours after the first instance. In all cases the laminates were tested for adhesion of the laminates and rated according to the following scale:

Excellent=3
Good=2
Fair=1
Poor=0

The results of the laminate adhesion tests are set forth in the following Table II. All of the tests included 0.1 weight percent paraffin wax. Tests A and C contained 20 percent by weight glass; tests B and D contained 25 weight percent glass. The polyester resin additive of Example 1 was included as 3 percent of the resin composition in tests C and D but was not included in tests A and B.

From Table II it can be observed that the laminate adhesion achieved when the polyester resin of Example 1 is combined with paraffin wax (tests C and D) is superior to that achieved with the wax alone.

TABLE II

| | COMPOSITION | | | ADHESION OF LAMINATE-SECOND LAYER APPLIED | | | |
|---|---|---|---|---|---|---|---|
| TEST | Glass | Wax | Ex. 1 | Immediate | 24 Hrs. | 48 Hrs. | Mean |
| A | 20% | 0.1 | 0 | 3 | 3 | 2 | 2.7 |
| B | 25% | 0.1 | 0 | 3 | 2 | 2 | 2.3 |
| C | 20% | 0.1 | 3.0 | 3 | 3 | 3 | 3 |
| D | 25% | 0.1 | 3.0 | 3 | 3 | 3 | 3 |

NOTE:
3 = excellent; 2 = good; 1 = fair; 0 = poor.

I claim:
1. A polymerizable resinous composition comprising 1 part by weight unsaturated polyester resin syrup containing
   45 to 80 weight percent unsaturated polyester resin;
   20 to 55 weight percent copolymerizable monomers, predominantly monomeric styrene;
   0.03 to 0.2 percent by weight hydrocarbon wax;
   0.5 to 7.0 percent by weight of an unsaturated alkyd resin product of
   alpha, beta-ethylenically unsaturated dicarboxylic acid;
   glycol; and
   linseed oil fatty acids.

* * * * *